(12) United States Patent
Li et al.

(10) Patent No.: US 9,938,445 B2
(45) Date of Patent: Apr. 10, 2018

(54) COMB POLYMER, METHOD OF PREPARING THE SAME, AND USE THEREOF

(71) Applicants: Sinopec Oilfield Service Corporation, Beijing (CN); Drilling Technology Research Institute of Sinopec Shengli Petroleum Engineering Co., LTD, Dongying (CN)

(72) Inventors: Gongrang Li, Dongying (CN); Qiang Lan, Dongying (CN); Peng Zhang, Dongying (CN); Chengsheng Zheng, Dongying (CN); Yunbo Xu, Dongying (CN); Xueqin Wu, Dongying (CN); Zuohui Li, Dongying (CN); Yanjun Zhou, Dongying (CN); Hong Zhang, Dongying (CN)

(73) Assignees: Sinopec Oilfield Service Corporation, Beijing (CN); Drilling Technology Research Institute of Sinopec, Dongying (CN)

( * ) Notice: Subject to any disclaimer, the term of this patent is extended or adjusted under 35 U.S.C. 154(b) by 40 days.

(21) Appl. No.: 14/582,901

(22) Filed: Dec. 24, 2014

(65) Prior Publication Data

US 2015/0203736 A1 Jul. 23, 2015

(30) Foreign Application Priority Data

Dec. 25, 2013 (CN) .......................... 2013 1 0727046

(51) Int. Cl.
| | |
|---|---|
| C09K 8/035 | (2006.01) |
| C08F 220/06 | (2006.01) |
| C09K 8/50 | (2006.01) |
| C08F 222/16 | (2006.01) |
| C08F 220/18 | (2006.01) |
| C08F 220/28 | (2006.01) |
| C08F 220/58 | (2006.01) |
| C08F 222/20 | (2006.01) |
| C08F 220/56 | (2006.01) |

(Continued)

(52) U.S. Cl.
CPC ............ *C09K 8/035* (2013.01); *C08F 220/06* (2013.01); *C09K 8/50* (2013.01); *C08F 220/18* (2013.01);

(Continued)

(58) Field of Classification Search
None
See application file for complete search history.

(56) References Cited

U.S. PATENT DOCUMENTS

2008/0269105 A1* 10/2008 Taft ...................... A61K 9/0019
514/1.1

FOREIGN PATENT DOCUMENTS

JP 11228940 A * 8/1999

* cited by examiner

*Primary Examiner* — Richard A Huhn
(74) *Attorney, Agent, or Firm* — Anderson Gorecki LLP

(57) ABSTRACT

The present disclosure discloses a comb polymer or a salt thereof, wherein the structural formula of the comb polymer containing the following constitutional units.

(Continued)

-continued

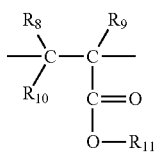

When the comb polymer provided in the present disclosure is used in a water-based drilling fluid as a filtration control agent, it can eliminate the defects of conventional filtration control agents which would be subject to ineffectiveness under high temperature and high salinity conditions. The comb polymer has high temperature and salt resistance, and can be produced through simple processes at comparatively low costs. When the comb polymer provided by the present disclosure is used as a filtration control agent, even being added into the drilling fluid at a comparatively low amount, it can still present rather good effects in lowering the amount of filter loss.

6 Claims, 1 Drawing Sheet

(51) Int. Cl.
    $C09K\ 8/24$ (2006.01)
    $C09K\ 8/508$ (2006.01)

(52) U.S. Cl.
    CPC ...... $C08F\ 220/56$ (2013.01); $C08F\ 2220/286$ (2013.01); $C08F\ 2220/585$ (2013.01); $C08F\ 2222/165$ (2013.01); $C08F\ 2222/205$ (2013.01); $C09K\ 8/24$ (2013.01); $C09K\ 8/5083$ (2013.01)

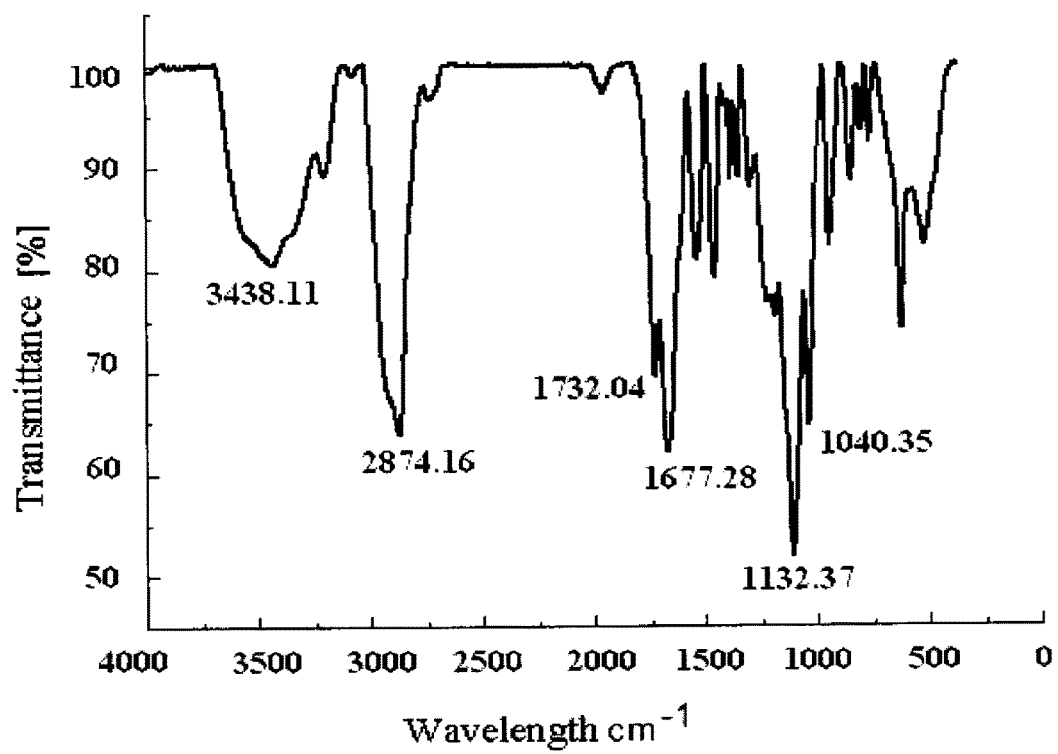

COMB POLYMER, METHOD OF PREPARING THE SAME, AND USE THEREOF

CROSS-REFERENCE TO RELATED APPLICATION

This application claims benefit of CN 201310727046.9, filed on Dec. 25, 2013, the entirety of which is incorporated herein for reference.

FIELD OF THE INVENTION

The present disclosure relates to the technical field of chemical additives used in drilling engineering, in particular to a comb polymer that can be used for reducing filter loss of a water-based drilling fluid.

BACKGROUND OF THE INVENTION

In oil exploration or drilling operations, drilling fluids are commonly used but would be lost due to penetration into the formation soil under pressure, the process of which is generally referred to as "water loss". A large amount of water loss into the soil will not only lead to the problem of borehole instability, but also harm the hydrocarbon reservoir. Currently, one solution to this problem is to add a filtration control agent in the drilling fluids. The filtration control agent has the following functions. It can comprehensively block capillary channels in a mud cake that is formed by the drilling fluid and the soil, making the mud cake smooth and compact, and can increase negative charge density on the mud cake to form a strong polarization water layer. Molecules of the filtration control agent can be absorbed on one side of clay crystal particles to form a bridging therebetween which can narrow down the pore size of the capillary channel. The filtration control agent can further improve wettability of the capillary channel in the mud cake. Therefore, the filtration control agent can enhance the filtration-reducing ability of the drilling fluid. Filtration control agent polymers commonly used at present in drilling fluids, on the other hand, have poor temperature resistance and salt resistance and poor chemical stability, and therefore are easily subject to hydrolysis under high temperatures. This would decrease the molecular weight of the polymers and render them ineffective.

SUMMARY OF THE INVENTION

To eliminate the effects in the prior art, the present disclosure provides a comb polymer or a salt thereof, which can be used as a filtration control agent having the function of high temperature and salt resistance. The comb polymer or the salt thereof is featured by convenient use with prominent filtration-reducing effects, and therefore can be widely used in drilling fluids.

According to one aspect of the present disclosure, a comb polymer or a salt thereof is provided, wherein the structural formula of the comb polymer contains the following constitutional units.

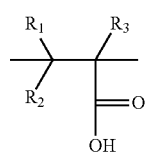
a

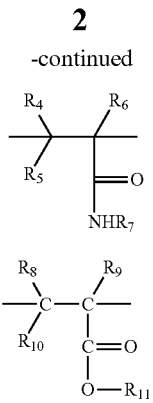

In the formula, $R_1$-$R_6$ and $R_9$-$R_{10}$, identical to or different from one another respectively, can be independently selected from a group consisting of hydrogen and $C_1$-$C_{22}$ hydrocarbyls; $R_7$ can be selected from a group consisting of hydrogen and alkyl sulfonic acids each containing 1 to 22 carbon atoms; $R_8$ can be selected from a group consisting of hydrogen, $C_1$-$C_{22}$ hydrocarbyls, carboxylic acids each containing 1 to 22 carbon atoms, and $COO[(CH_2)_xO]_mCH_3$; and $R_{11}$ can be selected from a group consisting of $(CH_2)_nCH_3$ and $[(CH_2)_xO]_mCH_3$, wherein the molar ratio of a to b to c is in the range of (20 to 50):(9 to 49):(1 to 60), with x, n, and m each being integers in the ranges from 2 to 4, 14 to 22, and 5 to 120, respectively.

In one preferred embodiment of the present disclosure, $R_1$-$R_6$ and $R_9$-$R_{10}$, identical to or different from one another respectively, can be independently selected from a group consisting of hydrogen and $C_1$-$C_4$ alkyls; $R_7$ can be selected from a group consisting of hydrogen and alkyl sulfonic acids each containing 1 to 4 carbon atoms; and $R_8$ can be selected from a group consisting of hydrogen, $C_1$-$C_4$ alkyls, and carboxylic acids each containing 1 to 4 carbon atoms, with m being an integer in the range from 10 to 110. Preferably, $R_2$, $R_3$, $R_5$, $R_6$, $R_9$, and $R_{10}$ are all hydrogen, and $R_1$, $R_4$, $R_5$, identical to or different from one another, can be selected from a group consisting of hydrogen and methyl, and $R_7$ can be selected from a group consisting of hydrogen and methylpropane sulfonic acid.

The comb polymer or the salt thereof obtained in the present disclosure has well-defined molecular structures, rigid molecular chains, and high resistance of temperature and salt.

According to one specific embodiment of the present disclosure, inverse emulsion polymerization is performed. In the present disclosure, molecular weight can be tested by a regular testing method (e.g. the intrinsic viscosity method). In one specific embodiment, the viscosity average molecular weight of the comb polymer can be in the range from 10,000 to 500,000, preferably 10,000 to 200,000.

In one specific embodiment, the structural formula of the comb polymer contains the following constitutional units.

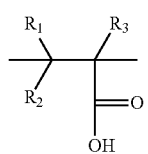
a $$b \quad \begin{array}{c} R_4 \quad R_6 \\ | \quad | \\ -\!\!\!-\!\!C\!\!-\!\!C\!\!-\!\!\!- \\ | \quad \| \\ R_5 \quad O \\ | \\ NHR_7 \end{array}$$

$$c \quad \begin{array}{c} HOOC \quad H \\ \phantom{x}\diagdown\phantom{x}|\phantom{x} \\ -\!\!\!-C\!\!-\!\!C\!\!-\!\!\!- \\ \phantom{x}\diagup\phantom{x}|\phantom{x} \\ H \quad C=\!\!O \\ | \\ O \\ | \\ (CH_2CH_2O)_m \\ | \\ CH_3 \end{array}$$

In the above formula, the molar ratio of a:b:c, the definitions of $R_1$-$R_7$, and the ranges of m are as described above, respectively.

According to the present disclosure, the comb polymer can contain a carboxylic acid bond and thus can generate a salt of the comb polymer when being reacted with an alkali.

According to the present disclosure, the structural formula of the comb polymer only indicates the composition of the comb polymer. The comb polymer can be but not limited to a block copolymer.

According to another aspect of the present disclosure, a method for preparing the above comb polymer is provided, comprising the steps of: mixing an aqueous solution of a first reactant, a second reactant, and a third reactant with an emulsifier and a nonpolar dispersion medium; and performing inverse emulsion polymerization in the presence of an initiator and optionally a catalyst, wherein the first reactant, the second reactant, and the third reactant are respectively an unsaturated acid, an unsaturated amide or a derivative thereof, and an unsaturated acid ester.

According to one preferred embodiment of the method of the present disclosure, the molar ratio of the first reactant, the second reactant, and the third reactant is in the range from (20-50):(9-49):(1-60). In the above ranges, the polymer obtained may have better performance.

According to one specific embodiment of the method of the present disclosure, the first reactant can be an unsaturated acid as shown in the formula of $R_1R_2C\!=\!CR_3COOH$, wherein the definitions of $R_1$-$R_3$ are as described above, respectively. Preferably, the first reactant can be at least one selected from a group consisting of acrylic acid and methacrylic acid.

According to another specific embodiment of the method of the present disclosure, the second reactant can be a compound as shown in the formula of $R_4R_5C\!=\!CR_6CONHR_7$, wherein the definitions of $R_4$-$R_7$ are as described above, respectively. Preferably, the second reactant can be at least one selected from a group consisting of acrylamide, methacrylamide, and 2-acrylamido-2-methylpropane sulfonic acid.

According to another specific embodiment of the method of the present disclosure, the third reactant can be an unsaturated acid ester as shown in the formula of $R_8R_9C\!=\!CR_{10}COOR_{11}$, wherein the definitions of $R_8$-$R_{11}$ are as described above, respectively. In one specific embodiment, the molecular weight of the unsaturated acid ester can be in the range from 500 to 5,000. In one preferred embodiment, the third reactant can be at least one selected from a group consisting of polyethylene glycol monomethyl ether, polyethylene glycol monomethyl ether acrylate, polyethylene glycol monomethyl ether maleate, and octadecyl acrylate.

According to the method of the present disclosure, the first and second reactants can provide a backbone of the polymer, while the third reactant can mainly provide branches of the polymer. The third reactant can comprise an unsaturated acid ester and can produce the comb polymer by copolymerization with the first and second reactants through polymerization of an unsaturated bond (e.g. an olefinic bond).

According to the method of the present disclosure, by "optional(ly)", it means that the polymerization can be performed in or not in the presence of a catalyst. According to the present disclosure, the reactants (including the first, the second, and the third reactants) can be used to prepare the comb polymer of the present disclosure through inverse emulsion polymerization. The aqueous solution of the reactants can be mixed with the nonpolar dispersion medium and dispersed into the nonpolar dispersion medium for polymerization under the action of the emulsifier, followed by polymerization under the effect of the initiator.

According to one specific embodiment of the method of the present disclosure, the initiator can be introduced to facilitate formation of a reactive polymerization center, so as to accelerate the polymerization reaction, wherein the initiator can optionally be a commonly used one. In one specific embodiment, the initiator can be selected from a group consisting of ammonium persulfate, potassium persulfate, sodium persulfate, sodium bisulfite, potassium bisulfate, benzoyl peroxide, and azobisisobutyronitrile.

In another specific embodiment of the method of the present disclosure, the polymerization can be performed in the presence of the catalyst, which is added to catalyze the polymerization reaction and shorten the reaction time. The catalyst can be any suitable one. In one specific embodiment, the catalyst can be at least one selected from a group consisting of aminobenzenesulfonic acid, orthanilic acid, and p-toluenesulfonic acid, sulfuric acid, alkyl benzene sulfonic acid, or a combination thereof.

In the comb polymer according to the present disclosure, the amount of the catalyst and/or initiator can be selected as actually required.

According to one specific embodiment of the method of the present disclosure, the nonpolar dispersion medium can be an oil phase. In one specific embodiment, the nonpolar dispersion medium can be white oil or diesel, for example, one or two selected from a group consisting of 5# white oil, 7# white oil, 15# white oil, and diesel.

According to one specific embodiment of the method of the present disclosure, the emulsifier can be a commonly used one in inverse emulsion polymerization. In one specific embodiment, the emulsifier can be at least one selected from a group consisting of octaphenylpolyoxyethyiene (OP-10), polyethoxylated sorbitan stearate (Tween60), and polyoxyethylene sorbitan monooleate (Tween80).

According to the method of the present disclosure, other additives, such as pH regulators (e.g. caustic soda and the like) can be added as required. In one specific embodiment, the polymerization can be performed under alkaline conditions. For example, sodium hydroxide or potassium hydroxide can be added to obtain the salt of the comb polymer (e.g. corresponding sodium salt or potassium salt).

In one specific embodiment of the method according to the present disclosure, 20 to 30 parts by weight of a pH regulator (such as caustic soda), 20 to 35 parts by weight of the first reactant, and 20 to 35 parts by weight of the second reactant can be successively added into 100 parts by weight of water to form an aqueous solution I. 3 to 5 parts by weight of an initiator (e g ammonium persulfate and sodium bisulfate) can be added into 100 parts by weight of water and sufficiently dissolved to prepare an initiator solution II. 20 to 30 parts by weight of the third reactant can be placed into a reactor and melted at 90° C., which can precede optional addition of 0.10 to 0.20 parts by weight of a catalyst and 0.3 to 0.8 parts by weight of the first reactant for reaction of 1.5 to 2.5 h at a temperature in the range from 90° C. to 95° C. The temperature can then be lowered down to below 40° C., followed by successive addition of 100 to 120 parts by weight of white oil, 5 to 15 parts by weight of an emulsifier, and the aqueous solution I. After homogenous mixing, 6 to 12 parts by weight of the initiator solution II can be dropwise added into the reactor. 0.5 to 1.5 hours of stirring can then be performed at 40° C. This temperature can be maintained constant while polymerization reaction is being performed for 3 to 5 h. According to the method of the present disclosure, after the inverse emulsion polymerization is completed, a solid of the comb polymer can be obtained through routine treatment steps.

According to the method provided by the present disclosure, the comb polymer obtained by inverse emulsion polymerization has the advantages of ready dissolution, a high effective content, and not being easily subject to violent polymerization.

According to another aspect of the present disclosure, a drilling fluid comprising the above comb polymer or the salt thereof or the comb polymer or the salt thereof prepared by the above method as a filtration-reducing is provided.

The comb polymer according to the present disclosure has well-defined molecular structures, rigid molecular chains, and high resistance of temperature and salt. When the comb polymer is used as a filtration control agent, it can present good effects in lowering the amount of filter loss of the drilling fluid. When the comb polymer of the present disclosure is used in a drilling fluid, the amount of filter loss of the drilling fluid can be significantly reduced. The comb polymer of the present disclosure has rather wide application prospects.

According to still another aspect of the present disclosure, use of the above comb polymer or the salt thereof or the comb polymer or the salt thereof prepared by the above method in oil exploitation is further provided. When the comb polymer or the salt thereof is used in oil exploitation, the amount of filter loss can be significantly reduced, thus improving the amount of oil exploitation.

Compared with the prior art, the present disclosure has the following advantages. When the comb polymer provided in the present disclosure is used in a drilling fluid as a filtration control agent, it can eliminate the defects of conventional filtration control agents which would be subject to ineffectiveness under high temperature and high salinity conditions. The rigid structure thereof enables the comb polymer with high temperature resistance (e.g. 180° C.) and high salt resistance (comb structure having an amido band, etc.). The comb polymer or the salt thereof can be produced through simple processes at comparatively low costs. When the comb polymer provided by the present disclosure is used as a filtration control agent, even being added into the drilling fluid at a comparatively low amount, it can still present rather good effects in lowering the amount of filter loss

BRIEF DESCRIPTION OF THE DRAWINGS

FIG. 1 shows infra-red spectrum according to one example of the present disclosure.

DETAILED DESCRIPTION OF THE EMBODIMENTS

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, group of elements, components, and/or groups thereof.

Language such as "including," "comprising," "having," "containing," or "involving," and variations thereof, is intended to be broad and encompass the subject matter listed thereafter, as well as equivalents, and additional subject matter not recited. Further, whenever a composition, a group of elements, process or method steps, or any other expression is preceded by the transitional phrase "comprising," "including" or "containing," it is understood that it is also contemplated herein the same composition, group of elements, process or method steps or any other expression with transitional phrases "consisting essentially of," "consisting of," or "selected from the group of consisting of," preceding the recitation of the composition, the group of elements, process or method steps or any other expression.

The present disclosure will be explained in further details with reference to examples, which, however, will not limit the present disclosure in any manner.

Testing Methods

Test of polymers: infrared spectrometer VERTEX-70 produced by Germany's Elemeraor company, KBr disc technique, and a nuclear magnetic resonance spectrometer Bruker Avance 400 MHz with deuterated dimethyl sulfoxide as a solvent were used.

Test of viscosity: Viscosity was tested by a drilling-fluid six-speed viscometer at room temperature. Apparent viscosity equals 600 times reading of rotation divided by 2.

Test of API filter loss: an API medium-pressure filtration device was used to measure the amount of filter loss at room temperature. API filter loss equals twice of the filter loss in 7.5 min.

FIG. 1 shows spectrum according to one example of the present disclosure by means of FT-IR. In FIG. 1, 3438.11 $cm^{-1}$ represents a characteristic absorption peak of an N—H bond in an amide group; 2874.16 $cm^{-1}$ represents an antisymmetric stretching vibration peak of a methyl group at a branch end; 1732.04 $cm^{-1}$ and 1677.28 $cm^{-1}$ are respectively in representation of a stretching vibration peak of a C=O bond in an ester and a stretching vibration peak of a C=O bond in an amide group; 1112.37 $cm^{-1}$ indicates a characteristic absorption peak of an ether in the structure of the polymer; and 1040.35 $cm^{-1}$ shows a stretching vibration peak of a C—O bond.

EXAMPLES OF SYNTHESIS

Example 1

20 g of caustic soda was added into 80 mL of fresh water, which preceded slow dropwise addition of 30 g of acrylic acid. 25 g of acrylamide was then gradually added. The resulting mixture was stirred for homogeneous mixing to prepare an aqueous solution I for use. 2.28 g of peroxosulfuric acid and 1.04 g of sodium bisulfite were weighed and dissolved into 100 mL of water to prepare an initiator solution II. After that, 20 g of polyethylene glycol monomethyl ether acrylate (the molecular weight of which is about 5,000) was weighed, placed into a reactor, and completely liquefied at 90° C. 0.1 g of aminobenzenesulfonic acid and 0.1 g of p-toluenesulfonic acid were then respectively added, followed by dropwise addition of 0.4 ml of acrylic acid. After reaction was kept for 2 h at 95° C. in the reactor, the temperature was lowered down to 40° C. Subsequently, 100 mL of 5# white oil, 8 mL of OP-10, 6 mL of Tween60, and the aqueous solution I were added into the reactor in succession. The resulting mixture was stirred to generate a swirl and was homogeneously mixed. 8 mL of the initiator solution II was then dropwise added into the reactor. The resulting mixture was stirred for 1 h at 40° C. and this temperature was maintained for 4 h after the stirring. After routine purification treatment, a comb polymer salt I was obtained, the infrared spectrum of which is shown in FIG. 1.

Example 2

The steps of Example 1 were repeated except the following differences. The aqueous solution I contained 25 g of caustic soda, 35 g of acrylic acid, and 30 g of acrylamide; 25 g of polyethylene glycol monomethyl ether acrylate (the molecular weight of which is about 2,400) was weighed, placed into a reactor, and completely liquefied at 90° C., followed by addition of 0.15 g of p-toluenesulfonic acid and dropwise addition of 0.5 ml of acrylic acid; 60 mL of 5# white oil, 60 mL of 7# white oil, 10 mL of OP-10, 7 mL of Tween60, and the aqueous solution I were successively added into the reactor; and 9 mL of the initiator solution II was dropwise added into the reactor. A comb polymer salt II was finally obtained.

Example 3

The steps of Example 1 were repeated except the following differences. The aqueous solution I contained 25 g of caustic soda, 20 g of acrylic acid, 15 g of methacrylic acid, and 35 g of acrylamide; 25 g of polyethylene glycol monomethyl ether maleate (the molecular weight of which is about 500) was weighed, placed into a reactor, and completely liquefied at 90° C., followed by addition of 0.15 g of alkyl benzene sulfonic acid and dropwise addition of 0.5 ml of acrylic acid; 120 mL of 7# white oil, 10 mL of OP-10, 8 mL of Tween80, and the aqueous solution I were successively added into the reactor; and 9 mL of the initiator solution II was dropwise added into the reactor. A comb polymer salt III was finally obtained.

The salts of the polymers in Examples 1 to 3 were tested by the infrared spectrometer and the nuclear magnetic resonance spectrometer, and the data thereof showed that the molar ratio among the three structure units was substantially the same as the molar ratio among the corresponding reactants added in the reactions.

EXAMPLES OF USE

Comparative Example 1

25 g of bentonite for slurry formulation was weighed and dissolved into 500 mL of water. The resulting mixture was stirred for 20 min, and stood for 24 h to obtain a bentonite slurry. The apparent viscosity and the API filter loss of the bentonite slurry were tested to be 18 mPa·s, and 24 mL, respectively.

Example 4

2.5 g of the comb polymer salt I was weighed and added into the bentonite slurry obtained in Comparative Example 1. The resulting mixture was stirred for 20 min to obtain a mud slurry. The apparent viscosity of the mud slurry was tested to be 37 mPa·s, and the API filter loss thereof was tested to be 10 mL by a drilling-fluid API medium-pressure filtration device.

Example 5

2.5 g of the comb polymer salt II was weighed and added into the bentonite slurry obtained in Comparative Example 1. The resulting mixture was stirred for 20 min to obtain a mud slurry. The apparent viscosity of the mud slurry and the API filter loss thereof were tested to be 40 mPa·s and 8 mL, respectively. The mud slurry was hot rolled for 16 h at 180° C., and then taken out to be cooled down to room temperature. The apparent viscosity of the mud slurry and the API filter loss thereof were then tested to be 27 mPa·s and 8.4 mL, respectively.

Example 6

2.5 g of the comb polymer salt III was weighed and added into the bentonite slurry obtained in Comparative Example 1. The resulting mixture was stirred for 20 min to obtain a mud slurry. The apparent viscosity of the mud slurry and the API filter loss thereof were tested to be 45 mPa·s and 6 mL, respectively. 50 g of sodium chloride was further added. And the apparent viscosity of the mud slurry and the API filter loss thereof were further tested to be 44 mPa·s and 7 mL, respectively. The mud slurry was hot rolled for 16 h at 180° C., and then taken out to be cooled down to room temperature. The apparent viscosity of the mud slurry and the API filter loss thereof were then tested to be 24 mPa·s and 7.2 mL, respectively.

TABLE 1

|  | Testing conditions | Apparent viscosity (mPa · s) | API filter loss (mL) |
|---|---|---|---|
| Comparative Example 1 | Room temperature | 18 | 24 |
| Example 4 | Room temperature | 37 | 10 |
| Example 5 | Room temperature | 40 | 8 |
|  | 180° C./16 h | 27 | 8.4 |
| Example 6 | Room temperature | 45 | 6 |
|  | Addition of NaCl | 44 | 7 |
|  | 180° C./16 h | 24 | 7.2 |

The data in Table 1 indicate that when the comb polymer or the salt thereof according to the present disclosure was used as a filtration control agent, it can effectively reduce the amount of filter loss and improve the apparent viscosity. Moreover, the comb polymer can still lead to a comparatively low amount of filter loss after being treated at a high temperature, which shows rather good temperature resistance of the comb polymer as a filtration control agent. After sodium chloride (10%) was further added, the comb polymer obtained, as a filtration control agent, can still effectively lower the amount of filter loss and improve the apparent viscosity, which shows rather good salt resistance of the comb polymer. Therefore, the comb polymer provided by the present disclosure, as a filtration control agent, possesses excellent temperature and salt resistance, favorable chemical stability, and superior comprehensive performance. The polymer can reduce the amount of filter loss and enhance the apparent viscosity with effect, and thus has rather broad application prospects.

Comparative Example 2

12 g of bentonite and 0.9 g of sodium carbonate were weighed and added into 300 mL of deionized water. The resulting mixture was stirred at a high speed for 20 min, stood, and hydrated for 24 h to obtain a fresh-water-base slurry (4%). The data tested are shown in Table 2. The fresh-water-base slurry was then hot rolled for 16 h at 180° C. and the data are shown in Table 2.

Comparative Example 3

Based on the volume of the fresh-water-base slurry obtained in Comparative Example 2, 1 wt/v % of DriscalD was added. The resulting mixture was stirred for 20 min. The data tested are shown in Table 2. 16 hours of hot rolling was then performed at 180° C. and the data are shown in Table 2.

Example 7

Based on the volume of the fresh-water-base slurry obtained in Comparative Example 2, 0.2 wt/v % of the comb polymer salt I was added. The resulting mixture was stirred for 20 min. The data tested are shown in Table 2. 16 hours of hot rolling was performed at 180° C. and the data are shown in Table 2.

TABLE 2

| | Testing conditions | Apparent viscosity (mPa·s) | Plastic viscosity (mPa·s) | Yield point (Pa) | API filter loss (mL) | pH |
|---|---|---|---|---|---|---|
| Comparative Example 2 | Room temperature | 7.2 | 2.5 | 4.7 | 27 | 8.00 |
| | 180° C./16 h | 6.5 | 5.5 | 1 | 33 | 7.50 |
| Example 7 | Room temperature | 20 | 14 | 6 | 9 | 8.86 |
| | 180° C./16 h | 9 | 8 | 1 | 18 | 9.08 |
| Comparative Example 3 | Room temperature | 66.5 | 21 | 45.5 | 11 | 8.00 |
| | 180° C./16 h | 36.5 | 24.5 | 12 | 18.2 | 7.50 |

The data in the table were tested and calculated according to the API standard.

It can be seen from Table 2 that, the filtration-reducing effect of a fresh-water drilling fluid with an addition of 0.2% of the comb polymer salt would be equal to the filtration-reducing effect thereof with an addition of 1% of DriscalD. After being aged at a high temperature of 180° C., the slurry added with the comb polymer salt can still maintain the performance thereof.

Comparative Example 4

24 g of sodium chloride was weighed and added to 300 mL of the drilling fluid of Comparative example 2. The resulting mixture was stirred for 20 min at a high speed and then stood for 24 h to obtain a salt-water-base slurry (8%). The data tested are shown in Table 3. 16 hours of hot rolling was performed at 180° C. and the data are shown in Table 3.

Comparative Example 5

Based on the volume of the salt-water-base slurry obtained in Comparative Example 4, 1 wt/v % of DriscalD was added. The resulting mixture was stirred for 20 min. The data tested are shown in Table 3. 16 hours of hot rolling was performed at 180° C. and the data are shown in Table 3.

Example 8

Based on the volume of the salt-water-base slurry obtained in Comparative Example 4, 1 wt/v % of the comb polymer salt I was added. The resulting mixture was stirred for 20 min. The data tested are shown in Table 3. 16 hours of hot rolling was performed at 180° C. and the data are shown in Table 3. The data in the table were tested and calculated according to the API standard.

TABLE 3

| | Testing conditions | Apparent viscosity (mPa·s) | Plastic viscosity (mPa·s) | Yield point (Pa) | Filter loss (ml) | pH |
|---|---|---|---|---|---|---|
| Comparative Example 4 | Room temperature | 4.5 | 3 | 1.5 | 53 | 8.00 |
| | 180° C./16 h | 2.5 | 2 | 0.5 | 120 | 7.50 |
| Example 8 | Room temperature | 23 | 13 | 10 | 12 | 8.50 |
| | 180° C./16 h | 10 | 8 | 2 | 20 | 8.59 |
| Comparative Example 5 | Room temperature | 45 | 21 | 24 | 7 | 9.00 |
| | 180° C./16 h | 12.5 | 11 | 1.5 | 19 | 7.00 |

Table 3 shows that when the same amount of a different filtration control agent (1 wt/v %) was added into a salt-water-base slurry, different results would be obtained after an aging treatment at a high temperature of 180° C. For example, when the comb polymer salt of the present disclosure was added, a high retention rate of viscosity of the base slurry can be obtained, and the apparent viscosity thereof was reduced by 55%; while addition of DriscalD would result in a reduction of apparent viscosity of the base slurry by 72%.

Comparative Example 6

180 g of sodium chloride was weighed and added into the bentonite slurry of Comparative example 1. The resulting mixture was stirred for 20 min and then stood for 24 h to obtain a saturated salt water slurry, and the data tested thereof are shown in Table 4. 16 hours of hot rolling was performed at 180° C. and the data are shown in Table 4.

Comparative Example 7

7.5 g of DriscalD was weighed and added into the saturated salt water slurry of Comparative Example 6. The resulting mixture was stirred for 20 min, and the performance thereof was tested and listed in Table 4.

Example 9

7.5 g of comb polymer I was weighed and added into the above saturated salt water slurry. The resulting mixture was stirred for 20 min, and the performance thereof was tested and listed in Table 4.

TABLE 4

|  | Testing conditions | Apparent viscosity (mPa·s) | Plastic viscosity (mPa·s) | Yield point (Pa) | Filter loss (ml) |
|---|---|---|---|---|---|
| Comparative Example 6 | Room temperature | 4 | 2.5 | 1.5 | 120 |
|  | 180° C./16 h | 2 | 1.5 | 0.5 | 280 |
| Comparative Example 7 | Room temperature | 33 | 18 | 15 | 20 |
|  | 180° C./16 h | 9.2 | 7 | 2.2 | 38 |
| Example 9 | Room temperature | 18 | 13 | 5 | 13 |
|  | 180° C./16 h | 9 | 7 | 2 | 22 |

Table 4 shows that in saturated salt water slurry, the comb polymer according to the present disclosure can effectively lower filter loss and improve apparent viscosity. After high-temperature treatment, a relatively low filter loss can still be maintained. Hence, the comb polymer, as a filtration control agent, has high temperature and salt resistance.

Comparative Example 8

15 g of calcium chloride was weighed and added into the bentonite slurry of Comparative example 1. The resulting mixture was stirred for 20 min and then stood for 24 h to obtain a 3 wt/v % calcium chloride-containing slurry, and the data tested thereof are shown in Table 5. 16 hours of hot rolling was performed at 180° C. and the data are shown in Table 5.

Comparative Example 9

7.5 g of DriscalD was weighed and added into the slurry of Comparative Example 8. The resulting mixture was stirred for 20 min, and the performance thereof was tested and listed in Table 5.

Example 10

7.5 g of comb polymer I was weighed and added into the slurry of Comparative Example 8. The resulting mixture was stirred for 20 min, and the performance thereof was tested and listed in Table 5.

TABLE 5

|  | Testing conditions | Apparent viscosity (mPa·s) | Plastic viscosity (mPa·s) | Yield point (Pa) | Filter loss (ml) |
|---|---|---|---|---|---|
| Comparative Example 8 | Room temperature | 3 | 2 | 1 | 96 |
|  | 180° C./16 h | 2 | 1.5 | 0.5 | 192 |
| Comparative Example 9 | Room temperature | 4 | 3 | 1 | 35 |
|  | 180° C./16 h | 5.5 | 4.5 | 1 | 56 |
| Example 10 | Room temperature | 4 | 3 | 1 | 22 |
|  | 180° C./16 h | 5 | 4 | 1 | 32 |

Table 5 shows that addition of the comb polymer according to the present disclosure in 3 wt/v % calcium chloride-containing slurry can effectively low filter loss and improve apparent viscosity. After high-temperature treatment, a relatively low filter loss can still be maintained. Hence, the comb polymer, as a filtration control agent, has high temperature and calcium resistance.

The data in Tables 2 to 5 indicate that compared with the prior art (e.g. DriscalD), when the comb polymer according to the present disclosure is used as a filtration control agent, it will lead to rather good filtration-reducing effect when being added at an extremely small amount. Furthermore, the comb polymer of the present disclosure has good high-temperature stability with high retention rate of viscosity, and better temperature, salt, and calcium resistance. The data relating to parameters of yield point and the like also show that the comb polymer provided by the present disclosure can be used in a drilling fluid as a filtration control agent.

It should be noted that the above examples are only used to explain, rather than to limit the present disclosure in any manner. Although the present disclosure has been discussed with reference to preferable examples, it should be understood that the terms and expressions adopted are for describing and explaining instead of limiting the present disclosure. The present disclosure can be modified within the scope of the claims, or can be amended without departing from the scope or spirits of the present disclosure. Although the present disclosure is described with specific methods, materials, and examples, the scope of the present disclosure herein disclosed should not be limited by the particularly disclosed examples as described above, but can be extended to other methods and uses having the same functions.

The invention claimed is:

1. A comb polymer or a salt thereof for reducing filter loss of an oil drilling fluid, wherein the structural formula of the comb polymer contains the following constitutional units:

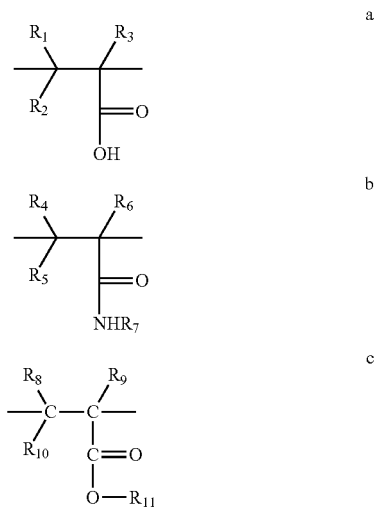

wherein the molar ratio of a to b to c is in the range of (20 to 50):(9 to 49):(1 to 60);

wherein $R_1$-$R_6$ are identical to or different from one another and are independently selected from a group consisting of hydrogen and $C_1$-$C_{22}$ hydrocarbyls;

wherein $R_7$ is selected from a group consisting of hydrogen and alkyl sulfonic acids containing 1 to 22 carbon atoms;

wherein $R_8$ is selected from a group consisting of hydrogen, a carboxylic acid containing 1 carbon atom, and $COO[(CH_2)_2O]_mCH_3$;

wherein $R_9$ and $R_{10}$ are hydrogen;

wherein $R_{11}$ is selected from a group consisting of $[(CH_2)_2O]_mCH_3$;

wherein m is an integer in the range from 5 to 120; and wherein constitutional unit "c" is polyethylene glycol monomethyl ether acrylate or polyethylene glycol monomethyl ether maleate.

2. The comb polymer according to claim 1, wherein the viscosity average molecular weight of the comb polymer is in the range from 10,000 to 500,000.

3. The comb polymer according to claim 2, wherein the viscosity average molecular weight of the comb polymer is in the range from 10,000 to 200,000.

4. The comb polymer according to claim 1, wherein $R_1$-$R_6$ and $R_9$-$R_{10}$, identical to or different from one another respectively, can be independently selected from a group consisting of hydrogen and $C_1$-$C_4$ alkyls;

wherein $R_7$ is selected from a group consisting of hydrogen and alkyl sulfonic acids each containing 1 to 4 carbon atoms; and wherein $R_8$ is selected from a group consisting of hydrogen, $C_1$-$C_4$ alkyls, and carboxylic acids each containing 1 to 4 carbon atoms, with m being an integer in the range from 10 to 110.

5. The comb polymer according to claim 4, wherein $R_2$, $R_3$, $R_5$, $R_6$, $R_9$, and $R_{10}$ are all hydrogen, wherein $R_1$ and $R_4$ are identical or different from one another and are selected from the group consisting of hydrogen and methyl, wherein $R_8$ is hydrogen, and wherein $R_7$ is selected from the group consisting of hydrogen and methylpropane sulfonic acid.

6. The comb polymer according to claim 1 prepared by mixing an aqueous solution of a first reactant, a second reactant, and a third reactant with an emulsifier and a nonpolar dispersion medium; and performing inverse emulsion polymerization in the presence of an initiator and an optional catalyst, wherein the first reactant, the second reactant, and the third reactant are respectively an unsaturated acid, an unsaturated amide or a derivative thereof, and an unsaturated acid ester.

* * * * *